US010536710B2

(12) United States Patent
Xu et al.

(10) Patent No.: US 10,536,710 B2
(45) Date of Patent: Jan. 14, 2020

(54) CROSS-LAYER CROSS-CHANNEL RESIDUAL PREDICTION

(75) Inventors: Lidong Xu, Beijing (CN); Yu Han, Beijing (CN); Wenhao Zhang, Beijing (CN); Yi-Jen Chiu, San Jose, CA (US); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 799 days.

(21) Appl. No.: 13/977,664

(22) PCT Filed: Jun. 27, 2012

(86) PCT No.: PCT/CN2012/077585
§ 371 (c)(1),
(2), (4) Date: Jan. 3, 2014

(87) PCT Pub. No.: WO2014/000168
PCT Pub. Date: Jan. 3, 2014

(65) Prior Publication Data
US 2015/0124875 A1      May 7, 2015

(51) Int. Cl.
*H04N 19/50* (2014.01)
(52) U.S. Cl.
CPC .................................. *H04N 19/50* (2014.11)
(58) Field of Classification Search
CPC ...... H04N 19/187; H04N 19/61; H04N 19/30; H04N 19/33; H04N 19/186; H04N 19/36; H04N 19/159; H04N 19/59; H04N 19/597; H04N 13/0048; H04N 13/0059; H04N 13/0239; H04N 19/105; H04N 19/147; H04N 19/573; H04N 2013/0081; H04N 19/44; H04N 19/176; H04N 19/31; H04N 19/157; H04N 19/436; H04N 19/50; H04N 19/70; H04N 5/21; H04N 19/86; H04N 19/154

See application file for complete search history.

(56) References Cited

U.S. PATENT DOCUMENTS

| 6,043,838 A * | 3/2000 | Chen ..................... G06T 7/97 |
| | | 348/42 |
| 8,422,555 B2 * | 4/2013 | Wang ................. H04N 19/105 |
| | | 375/240.01 |
| 8,705,624 B2 * | 4/2014 | Gupta ................. H04N 19/176 |
| | | 375/240.12 |
| 8,824,542 B2 * | 9/2014 | Nakagami ........... H04N 19/513 |
| | | 375/240 |

(Continued)

FOREIGN PATENT DOCUMENTS

| CN | 1728833 A | 2/2006 |
| CN | 101507277 A | 8/2009 |

(Continued)

OTHER PUBLICATIONS

Extended European Search Report for EP12880038.0, dated Jun. 28, 2016, 21 pages.

(Continued)

*Primary Examiner* — Dave Czekaj
*Assistant Examiner* — Kehinde Abimbola
(74) *Attorney, Agent, or Firm* — Jordan IP Law, LLC

(57) ABSTRACT

Systems, apparatus and methods are described including operations for video coding including cross-layer cross-channel residual prediction.

25 Claims, 9 Drawing Sheets

(56) References Cited

U.S. PATENT DOCUMENTS

| | | | | |
|---|---|---|---|---|
| 9,219,916 | B2* | 12/2015 | Su | H04N 19/126 |
| 9,277,235 | B2* | 3/2016 | Nakagami | H04N 19/513 |
| 9,392,274 | B2* | 7/2016 | Wang | H04N 19/105 |
| 9,497,456 | B2* | 11/2016 | Su | H04N 19/30 |
| 2005/0259729 | A1 | 11/2005 | Sun | |
| 2006/0013308 | A1 | 1/2006 | Kim et al. | |
| 2006/0153295 | A1* | 7/2006 | Wang | H04N 19/159 375/240.08 |
| 2006/0215762 | A1 | 9/2006 | Han et al. | |
| 2007/0157087 | A1 | 7/2007 | Cho et al. | |
| 2007/0286283 | A1* | 12/2007 | Yin | H04N 19/70 375/240.16 |
| 2008/0043840 | A1 | 2/2008 | Song | |
| 2008/0056356 | A1* | 3/2008 | Wang | H04N 19/105 375/240.12 |
| 2008/0089411 | A1 | 4/2008 | Wenger et al. | |
| 2008/0225952 | A1* | 9/2008 | Wang | H04N 19/105 375/240.16 |
| 2009/0074070 | A1* | 3/2009 | Yin | H04N 7/50 375/240.16 |
| 2009/0080535 | A1* | 3/2009 | Yin | H04N 19/63 375/240.26 |
| 2009/0097548 | A1 | 4/2009 | Karczewicz et al. | |
| 2009/0207919 | A1* | 8/2009 | Yin | H04N 19/63 375/240.25 |
| 2010/0061447 | A1 | 3/2010 | Tu et al. | |
| 2010/0128786 | A1* | 5/2010 | Gao | H04N 19/147 375/240.13 |
| 2010/0208810 | A1* | 8/2010 | Yin | H04N 19/105 375/240.12 |
| 2011/0122944 | A1* | 5/2011 | Gupta | H04N 19/176 375/240.12 |
| 2011/0286526 | A1* | 11/2011 | Nakagami | H04N 19/513 375/240.16 |
| 2013/0251030 | A1* | 9/2013 | Wang | H04N 19/105 375/240.03 |
| 2013/0329778 | A1* | 12/2013 | Su | H04N 19/126 375/240.01 |
| 2014/0023139 | A1* | 1/2014 | Xu | H04N 19/00781 375/240.12 |
| 2014/0247869 | A1* | 9/2014 | Su | H04N 19/30 375/240.03 |
| 2014/0334549 | A1* | 11/2014 | Nakagami | H04N 19/513 375/240.16 |
| 2015/0326865 | A1* | 11/2015 | Yin | H04N 19/46 375/240.13 |
| 2016/0065975 | A1* | 3/2016 | Su | H04N 19/126 375/240.01 |
| 2016/0142731 | A1* | 5/2016 | Nakagami | H04N 19/513 375/240.16 |

FOREIGN PATENT DOCUMENTS

| | | |
|---|---|---|
| CN | 101663896 A | 3/2010 |
| CN | 101796841 A | 8/2010 |
| CN | 102144391 A | 8/2011 |
| EP | 1509045 A2 | 2/2005 |
| JP | 2005-39841 A | 2/2005 |
| JP | 2009-517959 A | 4/2009 |
| JP | 2009-543423 A | 12/2009 |
| JP | 2011-182167 A | 9/2011 |
| JP | 2011254555 A | 12/2011 |
| JP | 2013258651 A | 12/2013 |
| WO | 2008128898 A1 | 10/2008 |
| WO | 2014/000154 A1 | 1/2014 |

OTHER PUBLICATIONS

Amonou, et al., "Improving inter-layer prediction," Joint Video Team of ISO/IEC JTC1/SC29/WG11 and ITU-T SG. 16, JVT-T053, Klangefurt, AT, Jul. 15, 2006.

Zhang et al., "Multi-order-residual (MOR) video coding: framework, analysis, and performance," Visual Communications and Image Processing; Huang Shan, An Hui, CN, Jul. 11, 2010.

Kawamura, et al., "Chroma intra prediction based on residual luma samples," JCT-VC Meeting; 97 MPEG Meeting; Jul. 14-Jul. 22, 2011; Joint Collaborative Team on Video Coding of ISO/IEC JTC1/SC29/WG11 and ITU-T SG.16; JCTVC-F095, Jul. 1, 2011.

Cho et al., "New Intra Luma Prediction Mode in H.264/AVC Using Collocated Weighted Chroma Pixel Value," Advanced Concepts for Intelligent Vision Systems Lecture Notes in Computer Science, Jan. 1, 2006, Berline, DE, pp. 344-353.

Shen et al., "CE7: Adaptive inter-layer prediction", Joint Video Team of ISO/IEC JTC1/SC29/WG11 and ITU-T SG.16, JVT-V039, Jan. 10, 2007.

Zhang et al., "A Second-order-residual (SOR) coding approach to high-bit-rate video compression", Biomedical Photonics and Optoelectronic Imaging, Nov. 8-10, 2000, Beijing, CN, vol. 7543, Jan. 17, 2010.

Notice of Reasons for Rejection for Japanese Patent Application No. 2015-517579, dated Dec. 15, 2015, 4 pages (plus translation, 2 pages).

Yoshitaka Morigami et al., "Low-Complexity Algorithm for Inter-Layer Residual Prediction of H.264/SVC"; 2009 16th IEEE International Conference on Image Processing (IPIP); Nov. 7, 2009, pp. 3761-3764.

Supplementary Partial European Search Report for EP Patent Application No. EP12880038, dated Mar. 7, 2016, 7 pages.

Chen, et al., "CE6.a: Chroma intra prediction by reconstructed luma samples", Joint Collaborative Team on Video Coding (JCT-VC) of ITU-T SG16 WP3 and ISO/IEC JTC1/SC29/WG11, JCTVC-E266, 5th Meeting: Geneva, Mar. 2011, 7 Pages.

Chiu, et al., "Cross-channel intra chroma residual prediction", Joint Collaborative Team on Video Coding (JCT-VC) of ITU-T SG16 WP3 and ISO/IEC JTC1/SC29/WG11, JCTVC-G173, 7th Meeting: Geneva, CH, Nov. 2011, 6 Pages.

Kawamura, et al., "CE6.a: Chroma intra prediction based on residual luma samples", Joint Collaborative Team on Video Coding (JCT-VC) of ITU-T SG16 WP3 and ISO/IEC JTC1/SC29/WG11, JCTVC-H0117, 8th Meeting: San José, CA, USA, Feb. 2012, 8 Pages.

Kawamura, et al., "Chroma intra prediction based on residual luma samples", Joint Collaborative Team on Video Coding (JCT-VC) of ITU-T SG16 WP3 and ISO/IEC JTC1/SC29/WG11, JCTVC-G346, 7th Meeting: Geneva, CH, Nov. 2011, 3 Pages.

Kawamura, et al. "Chroma intra prediction based on residual luma samples", Joint Collaborative Team on Video Coding (JCT-VC) of ITU-T SG16 WP3 and ISO/IEC JTC1/SC29/WG11, JCTVC-F095, 6th Meeting: Torino, IT, Jul. 2011, 4 Pages.

International Search Report and Written Opinion received for PCT Patent Application No. PCT/CN2012/077585, dated Apr. 4, 2013, 11 Pages.

Kawamura et al., "Inter-channel Prediction Coding under CTB Structure", Abstracts of IEICE Transactions on Information and Systems (Japanese Edition), May 1, 2012, Abstract, vol. J95-D No. 5, The Institute of Electronics, Information, and Communication Engineers.

Office Action for Chinese Patent Application No. 201280073483.7, dated Aug. 7, 2017, 22 pages including 12 pages of English translation.

Office Action for Chinese Patent Application No. 201280073483.7, dated Dec. 16, 2016, 30 pages including 19 pages of English translation.

Notice of Rexamination for Chinese Patent Application No. 201280073483.7, dated Aug. 28, 2018, 18 pages including 8 pages of English translation.

Office Action for Chinese Patent Application No. 201280073483.7, dated Jan. 29, 2018, 20 pages including 13 pages of English translation.

Notice of Rexamination for Chinese Patent Application No. 201280073483.7, dated Feb. 25, 2019, 30 pages including 11 pages of English translation.

\* cited by examiner

CROSS-LAYER CROSS-CHANNEL
RESIDUAL PREDICTION

BACKGROUND

A video encoder compresses video information so that more information can be sent over a given bandwidth. The compressed signal may then be transmitted to a receiver that decodes or decompresses the signal prior to display.

High Efficient Video Coding (HEVC) is a new video compression standard planned to be finalized by the end 2012. It is currently under development by the Joint Collaborative Team on Video Coding (JCT-VC) formed by ISO/IEC Moving Picture Experts Group (MPEG) and ITU-T Video Coding Experts Group (VCEG). The team will also standardize a Scalable Video Coding (SVC) extension of HEVC standard.

In the current HEVC specification, a picture is coded in the unit of Largest Coding Unit (LCU). A LCU can be a 128×128 block, a 64×64 block, a 32×32 block or a 16×16 block. A LCU can be encoded directly or be divided into 4 Coding Unit (CU) for next level encoding. For a CU in one level, it can be encoded directly or be further divided into next level for encoding. The smallest CU is 8×8.

In general, at each level a CU whose size is 2N×2N, may be divided into different size of Prediction Units (PU) for prediction. For intra coding, a 2N×2N CU can be encoded in one 2N×2N PU or in four N×N PUs. For inter coding, a 2N×2N CU can be encoded in one 2N×2N PU, or two 2N×N PUs, or two N×2N PUs, or 0.5N×2N PU+1.5N×2N PU, or 1.5N×2N PU+0.5N×2N PU, or 2N×0.5N PU+2N×1.5N PU, or 2N×1.5N PU+2N×0.5N PU, or four N×N PUs.

In non-gray pictures, a picture consists of the data of three channels, i.e., Luma channel Y and two Chroma channel U and V. And correspondingly, a PU consists of one luma block Y and two Chroma blocks U and V.

In an HEVC encoder, after intra prediction (Intra-frame Prediction module) or inter prediction (Motion Estimation and Motion Compensation modules) are performed, the prediction residuals corresponding to the difference between an input PU and the predicted PU are transformed and quantized for entropy coding. When a PU is encoded in intra coding mode, different intra prediction modes may be applied including DC prediction, planar prediction, horizontal prediction, vertical prediction and so forth.

As the standardization of the main part of HEVC is reaching completion, JCT-VC has started planning to add a Scalable Video Coding (SVC) extension into HEVC standard. SVC is an important issue to cope with the heterogeneity of networks and devices in modern video service environment. An SVC bit stream contains several subset bit streams that can themselves be decoded, and these sub streams represent the source video content with different resolution, frame rate, quality, bit depth, and etc. The scalabilities are achieved by using a multi-layer coding structure. In general, there is typically one base layer and several enhancement layers in an SVC system.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
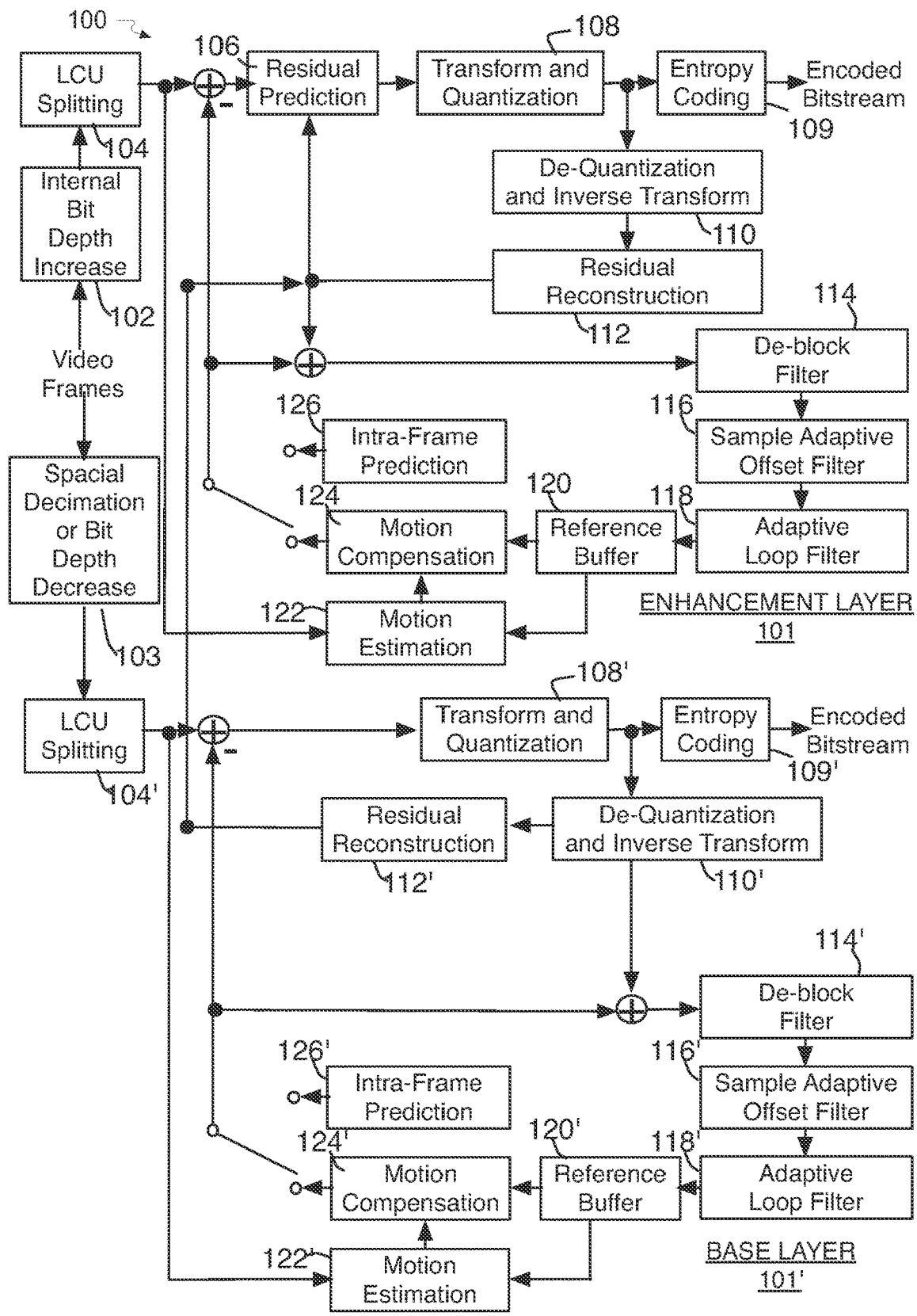
FIG. 1 is an illustrative diagram of an example video coding system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for video coding including cross-layer cross-channel residual prediction.

As described above, in scalable video coding, a base layer may be encoded at first, then enhancement layers. In a cross-layer prediction, the information of the base layer can be used to encode enhancement layers. When the input video sequence is in color format, it will have three color channels, i.e., one Luma channel Y and two Chroma channels U and V. Typically, the three channels may be predicted, transformed and quantized separately for entropy coding.

However, as will be described in greater detail below, the three channels are not completely decorrelated. Furthermore, if any two of the three channels use the same prediction type and/or the same prediction mode, the prediction residuals of the two channels may still have strong correlations. Therefore, cross-layer cross-channel residual prediction may be utilized to improve enhancement layer coding efficiency.

FIG. 1 is an illustrative diagram of an example video coding system 100, arranged in accordance with at least some implementations of the present disclosure. In various implementations, video coding system 100 may be configured to undertake video coding and/or implement video codecs according to one or more advanced video codec standards, such as, for example, the High Efficiency Video Coding (HEVC) H.265 video compression standard being developed by the Joint Collaborative Team on Video Coding (JCT-VC) formed by ISO/IEC Moving Picture Experts Group (MPEG) and ITU-T Video Coding Experts Group (VCEG). Further, in various embodiments, video coding system 100 may be implemented as part of an image processor, video processor, and/or media processor and may undertake inter prediction, intra prediction, predictive coding, and/or residual prediction including cross-channel residual prediction in accordance with the present disclosure.

As used herein, the term "coder" may refer to an encoder and/or a decoder. Similarly, as used herein, the term "coding" may refer to encoding via an encoder and/or decoding via a decoder. For example video encoder 103 and video decoder 105 may both be examples of coders capable of coding.

In some examples, video coding system 100 may include additional items that have not been shown in FIG. 1 for the sake of clarity. For example, video coding system 100 may include a processor, a radio frequency-type (RF) transceiver, a display, and/or an antenna. Further, video coding system 100 may include additional items such as a speaker, a microphone, an accelerometer, memory, a router, network interface logic, etc. that have not been shown in FIG. 1 for the sake of clarity.

In some examples, video coding system 100 may perform SVC operations. For example, two spatial resolution layers (e.g., base layer 101' and enhancement layer 101), are illustrated; however, any number of enhancement layers may be utilized in addition to base layer 101'. Base layer 101' may be processed via an HEVC compatible encoder. Information associated with base layer (e.g., such as prediction mode, reconstructed pixel and so on) may be used for coding of enhancement layer 101.

For example, during the operation of video coding system 100 on enhancement layer 101, current video information may be provided to an internal bit depth increase module 102 in the form of a frame of video data. The current video frame may be split into Largest Coding Units (LCUs) at module 104 and then passed to a residual prediction module 106. The output of residual prediction module 106 may be subjected to known video transform and quantization processes by a transform and quantization module 108. The output of transform and quantization module 108 may be provided to an entropy coding module 109 and to a de-quantization and inverse transform module 110. De-quantization and inverse transform module 110 may implement the inverse of the operations undertaken by transform and quantization module 108 to provide the output of residual prediction module 106 to a residual reconstruction module 112. Those skilled in the art may recognize that transform and quantization modules and de-quantization and inverse transform modules as described herein may employ scaling techniques. The output of residual reconstruction module 112 may be fed back to residual prediction module 106 and may also be provided to a loop including a de-blocking filter 114, a sample adaptive offset filter 116, an adaptive loop filter 118, a buffer 120, a motion estimation module 122, a motion compensation module 124 and an intra-frame prediction module 126. As shown in FIG. 1, the output of either motion compensation module 124 or intra-frame prediction module 126 is both combined with the output of residual prediction module 106 as input to de-blocking filter 114, and is differenced with the output of LCU splitting module 104 to act as input to residual prediction module 106.

Similarly, during the operation of video coding system 100 on base layer 101', current video information may be provided to a spatial decimation or bit depth decrease module 103 in the form of a frame of video data. The current video frame may be split into Largest Coding Units (LCUs) at module 104' and then passed to a transform and quantization module 108'. Transform and quantization module 108' may perform known video transform and quantization processes. The output of transform and quantization module 108' may be provided to an entropy coding module 109' and to a de-quantization and inverse transform module 110'. De-quantization and inverse transform module 110' may implement the inverse of the operations undertaken by transform and quantization module 108' to provide the output of LCU module 104' to a residual reconstruction module 112' and may also be provided to a loop including a de-blocking filter 114', a sample adaptive offset filter 116', an adaptive loop filter 118', a buffer 120', a motion estimation module 122', a motion compensation module 124' and an intra-frame prediction module 126'. Those skilled in the art may recognize that transform and quantization modules and de-quantization and inverse transform modules as described herein may employ scaling techniques. The output of residual reconstruction module 112' may be fed back to residual prediction module 106 (e.g., residual prediction module 106 being utilized for processing of enhancement layer 101 as apposed to base layer 101') and may also be provided to a loop including a de-blocking filter 114, a sample adaptive offset filter 116, an adaptive loop filter 118, a buffer 120, a motion estimation module 122, a motion compensation module 124 and an intra-frame prediction module 126 (e.g., those modules being utilized for processing of enhancement layer 101 as apposed to base layer 101'). As shown in FIG. 1, the output of either motion compensation module 124' or intra-frame prediction module 126' is both combined with the output of de-quantization and inverse transform module 110' as input to de-blocking filter 114', and is differenced with the output of LCU splitting module 104 to act as input to transform and quantization module 108'.

As will be explained in greater detail below, residual prediction module 106 may act in conjunction with residual reconstruction module 112 to provide cross-layer cross-channel residual prediction in accordance with the present disclosure. In various implementations, residual prediction module 106 may be used to generate prediction residuals for one channel of video data and residual reconstruction module 112 may reconstruct that channel's prediction residuals for use by residual prediction module 106 in generating the prediction residuals for another layer and/or another channel of video data. For example, residual prediction module 106 may use the reconstructed residual from residual reconstruction module 112' of base layer 101' luminance (luma) channel of a prediction unit (PU) to generate the prediction residuals for enhancement layer 101 chrominance (chroma) channels of the PU. For another example, the residual prediction module 106 may also use the reconstructed residual from residual reconstruction module 112 of enhancement layer 101 luma channel of a PU to generate the prediction residuals for enhancement layer chroma channels of the PU.

In general, when processing a target channel, if any channel in another layer or another channel in the same layer as the target channel uses the same prediction type and/or the same prediction mode, a possible correlation may result between the prediction residuals of the two channels. Accordingly, employing cross-layer cross-channel residual prediction techniques as described herein may facilitate the removal of redundant information and allow for higher video coding efficiencies.

In various implementations, residual prediction may be performed on prediction residuals, and the resulting second-order prediction residuals between the initial prediction residuals and the predicted residuals may be transformed and quantized. In cross-layer cross-channel residual prediction techniques in accordance with the present disclosure, if the residuals of a first channel (A) are to be predicted from the residuals of a second channel (B), the residuals of channel B as generated by residual prediction module 106 may be encoded (e.g., transformed and quantization) by transform and quantization module 108 and then reconstructed by de-quantization and inverse transform module 110 and residual reconstruction module 112 first, and then the reconstructed residuals of channel B may be used by residual prediction module 106 to subsequently predict the residuals of channel A.

As will be discussed in greater detail below, video coding system 100 may be used to perform some or all of the various functions discussed below in connection with FIGS. 2 and/or 3.

Figure 2:
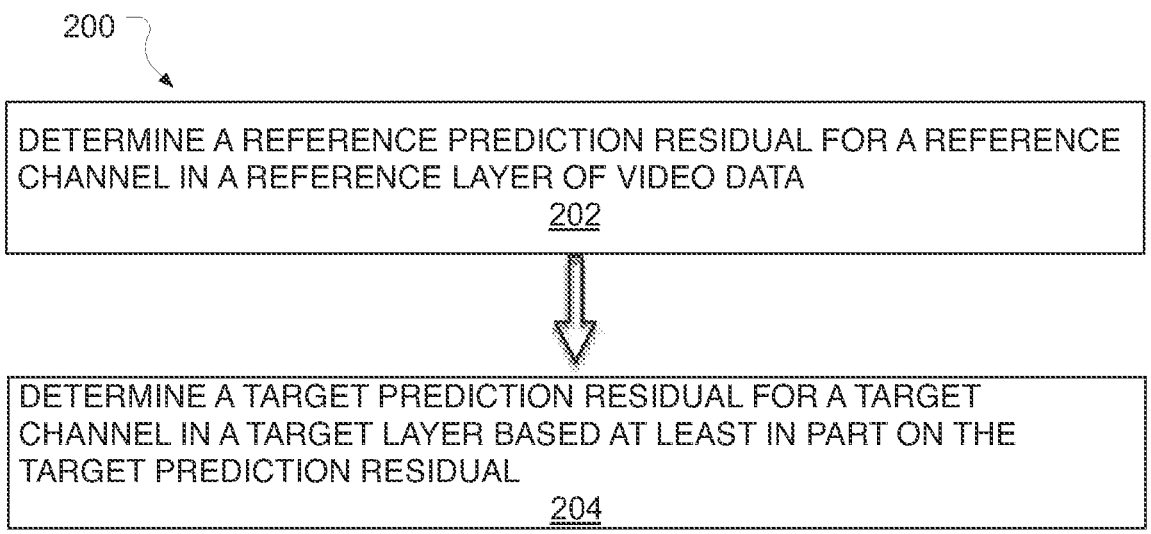
FIG. 2 is a flow chart illustrating an example video coding process.

FIG. 2 is a flow chart illustrating an example video coding process 200, arranged in accordance with at least some implementations of the present disclosure. In the illustrated implementation, process 200 may include one or more operations, functions or actions as illustrated by one or more of blocks 202 and/or 204. By way of non-limiting example, process 200 will be described herein with reference to example video coding system 100 of FIGS. 1 and/or 7.

Process 200 may be utilized as a computer-implemented method for cross-layer cross-channel residual prediction. Process 200 may begin at block 202, "DETERMINE A REFERENCE PREDICTION RESIDUAL FOR A REFERENCE CHANNEL IN A REFERENCE LAYER OF VIDEO DATA", where a reference prediction residual may be determined for a reference channel in a reference layer of video data. For example, the reference prediction residual may be determined for a reference channel in a reference layer of video data via a video coder.

Processing may continue from operation 202 to operation 204, "DETERMINE A TARGET PREDICTION RESIDUAL FOR A TARGET CHANNEL IN A SECOND LAYER BASED AT LEAST IN PART ON THE TARGET PREDICTION RESIDUAL", where a target prediction residual may be determined for a target channel in a target layer based at least in part on the reference prediction residual. For example target prediction residual may be determined for a target channel in a target layer based at least in part on the reference prediction residual via the video coder. Such a determination may be made via cross-layer cross-channel prediction. In some examples, the target layer may be a higher layer than the reference layer and/or the target channel may be a different channel than the reference channel.

In operation, the target layer may be a higher layer than the reference layer and/or the target channel may be a different channel than the reference layer. For, example, when the reference layer includes a base layer, the target layer may include an enhancement layer; and when the reference layer includes an enhancement layer, the target layer may include a higher enhancement layer. Additionally or alternatively, when the reference channel includes a luma channel, the target channel may include a chroma channel; and when the reference channel includes a chroma channel, the target channel may include one of a luma channel or another chroma channel.

Some additional and/or alternative details related to process 200 may be illustrated in one or more examples of implementations discussed in greater detail below with regard to FIG. 3.

Figure 3:
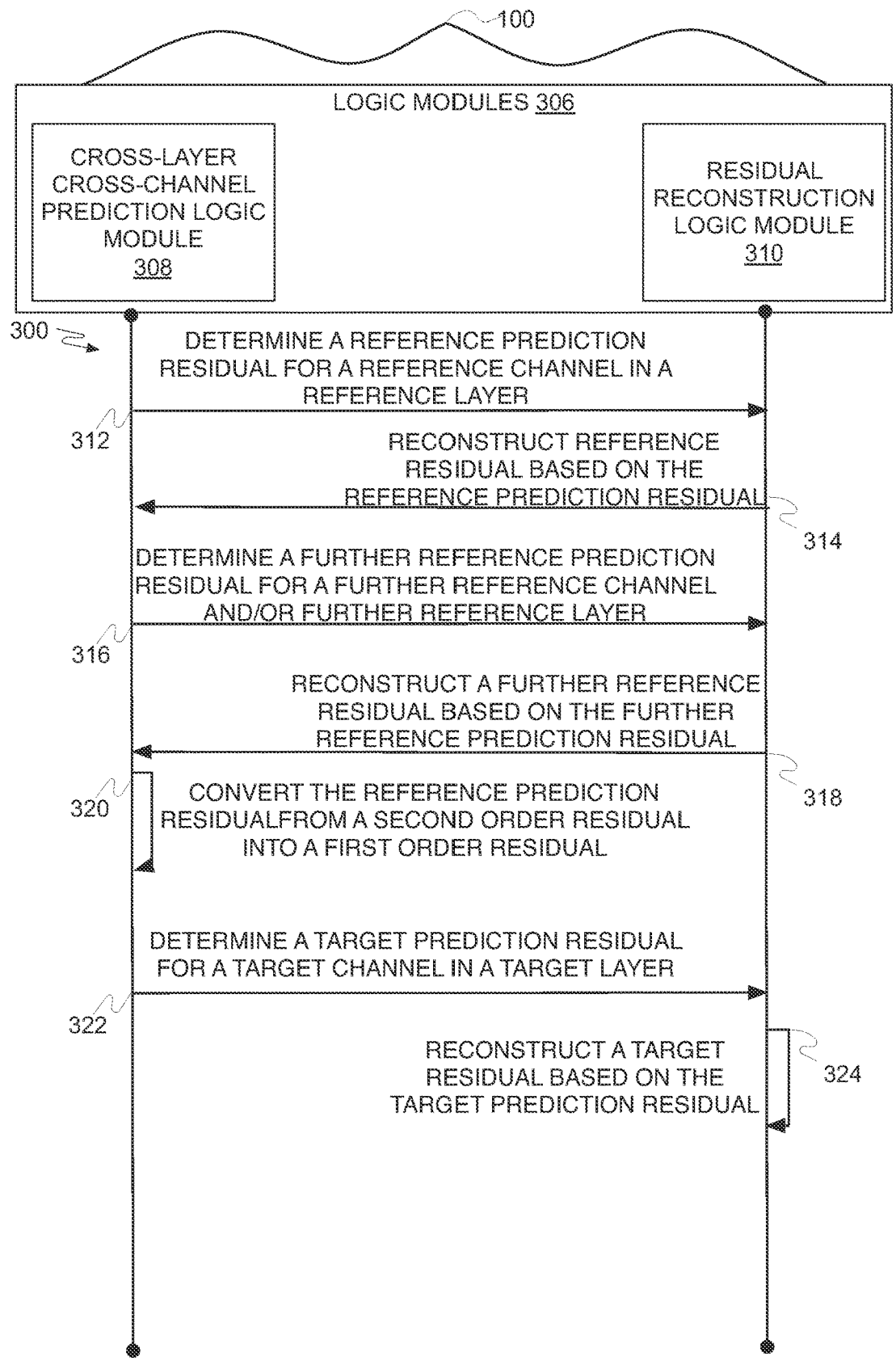
FIG. 3 is an illustrative diagram of an example video coding process in operation.

FIG. 3 is an illustrative diagram of example video coding system 100 and video coding process 300 in operation, arranged in accordance with at least some implementations of the present disclosure. In the illustrated implementation, process 300 may include one or more operations, functions or actions as illustrated by one or more of actions 312, 314, 316, 318, 320, 322, and/or 324. By way of non-limiting example, process 300 will be described herein with reference to example video coding system 100 of FIGS. 1 and/or 7.

In the illustrated implementation, video coding system 100 may include logic modules 306, the like, and/or combinations thereof. For example, logic modules 306, may include cross-layer cross-channel prediction logic module 308, residual prediction logic module 310, the like, and/or combinations thereof. Cross-layer cross-channel prediction logic module 308 of video coding system 100 may be configured to determine a reference prediction residual for a reference channel in a reference layer of video data, and determine a target prediction residual for a target channel in a target layer based at least in part on the reference prediction residual via cross-layer cross-channel prediction. The target layer may be a higher layer than the reference layer, and the target channel may be a different channel than the reference channel. Residual reconstruction logic module 310 of video coding system 100 may be communicatively coupled to cross-layer cross-channel prediction logic module 308 and may be configured to reconstruct a target residual based at least in part on the determined target prediction residual. Although video coding system 100, as shown in FIG. 3, may include one particular set of blocks or actions associated with particular modules, these blocks or actions may be associated with different modules than the particular module illustrated here.

Process 300 may be utilized as a computer-implemented method for cross-layer cross-channel residual prediction. Process 300 may begin at block 312, "DETERMINE A REFERENCE PREDICTION RESIDUAL FOR A REFERENCE CHANNEL IN A REFERENCE LAYER OF VIDEO DATA", where a reference prediction residual may be determined for a reference channel in a reference layer of video data. For example, the reference prediction residual may be determined for a reference channel in a reference layer of video data via a video coder.

Processing may continue from operation 312 to operation 314, "RECONSTRUCT REFERENCE RESIDUAL BASED ON THE REFERENCE PREDICTION RESIDUAL", where a reference residual may be constructed based at least in part on the reference prediction residual. For example, reference residual may be constructed based at least in part on the reference prediction residual via residual prediction logic module 310.

Processing may continue from operation 314 to operation 316, "DETERMINE A FURTHER REFERENCE PREDICTION RESIDUAL FOR A FURTHER REFERENCE CHANNEL AND/OR FURTHER REFERENCE LAYER", where a further reference prediction residual may be determined for a further reference channel and/or further reference layer. For example, the further reference prediction residual may be determined for a further reference channel and/or further reference layer via cross-layer cross-channel prediction logic module 308.

Processing may continue from operation 316 to operation 318, "RECONSTRUCT A FURTHER REFERENCE RESIDUAL BASED ON THE FURTHER REFERENCE PREDICTION RESIDUA", where a further reference residual may be constructed based at least in part on the further reference prediction residual. For example, the further reference residual may be constructed based at least in part on the further reference prediction residual via residual prediction logic module 310.

Processing may continue from operation 318 to operation 320, "CONVERT THE REFERENCE PREDICTION RESIDUAL FROM A SECOND ORDER RESIDUAL INTO A FIRST ORDER RESIDUAL", where the reference prediction residual from a second order residual may be converted from a second order residual into a first order residual. For example, the reference prediction residual from a second order residual may be converted from a second order residual into a first order residual via cross-layer cross-channel prediction logic module 308.

Processing may continue from operation 314, 318, and/or 320 to operation 322, "DETERMINE A TARGET PREDICTION RESIDUAL FOR A TARGET CHANNEL IN A TARGET LAYER", where a target prediction residual may be determined. For example, target prediction residual may be determined for a target channel in a target layer via the video coder. Such a determination may be made via cross-layer cross-channel prediction. In some examples, the target layer may be a higher layer than the reference layer and/or the target channel may be a different channel than the reference channel.

In some examples, the target layer may be a higher layer than the reference layer and/or the further reference layer, and/or the target channel may be a different channel than the reference layer and/or the further reference layer. For, example, when the reference layer includes a base layer, the target layer may include an enhancement layer; and when the reference layer includes an enhancement layer, the target layer may include a higher enhancement layer. Additionally or alternatively, when the reference channel includes a luma channel, the target channel may include a chroma channel; and when the reference channel includes a chroma channel, the target channel may include one of a luma channel or another chroma channel.

Similarly, the target layer may be a higher layer than the further reference layer and/or the target channel may be a different channel than the further reference layer. For, example, when the further reference layer includes a base layer, the target layer may include an enhancement layer; and when the further reference layer includes an enhancement layer, the target layer may include a higher enhancement layer. Additionally or alternatively, when the further reference channel includes a luma channel, the target channel may include a chroma channel; and when the further reference channel includes a chroma channel, the target channel may include one of a luma channel or another chroma channel.

In examples where processing continues from operation 314 to operation 322, the target prediction residual may be determined based at least in part on the reference prediction residual determined at operation 312 and reconstructed at operation 314. Some additional and/or alternative details related to operation 322 may be illustrated in one or more examples of implementations discussed in greater detail below with regard to FIG. 4.

In examples where processing continues from operation 318 to operation 322, the target prediction residual may be determined based at least in part on the further reference prediction residual determined at operation 316 and reconstructed at operation 318. Alternatively, the target prediction residual may be determined based at least in part on the further reference prediction residual (determined at operation 316 and reconstructed at operation 318) in addition to the reference prediction residual (determined at operation 312 and reconstructed at operation 314). For example, the determination, via the video coder, of the target prediction residual for the target channel in the target layer may be based at least in part on the further reference prediction residual in addition to the reference prediction residual. Some additional and/or alternative details related to operation 322 may be illustrated in one or more examples of implementations discussed in greater detail below with regard to FIG. 5.

In examples where processing continues from operation 320 to operation 322, the target prediction residual may be determined based at least in part on a first order residual that had been converted from a second order residual. For example, the video coder may reconstruct a first-order-type reference prediction residual from a second-order-type reference prediction residual of the further reference prediction residual based at least in part on the reference prediction residual. The determination, via the video coder, of the target prediction residual for the target channel in the target layer may be based at least in part on the reconstructed first-order-type reference prediction residual of the further reference prediction residual. Some additional and/or alternative details related to operation 322 may be illustrated in one or more examples of implementations discussed in greater detail below with regard to FIG. 6.

Processing may continue from operation 322 to operation 324, "RECONSTRUCT A TARGET RESIDUAL BASED ON THE TARGET PREDICTION RESIDUAL", where a target residual may be reconstructed based on the target prediction residual. For example, a target residual may be reconstructed based on the target prediction residual via residual prediction logic module 310.

In operation, process 300 (and/or process 200) may operate so that the determination of the target prediction residual may include applying a linear relation model or a non-linear relation model. For example, the determination of the target prediction residual may include adaptively applying one of a linear relation model or a non-linear relation model. In some examples, such a linear relation model or a non-linear relation model may be adaptively applied in response to an encoding mode. For example, process 300 may apply different relation models to different encoding modes. For example, different relation models may be used for an intra coding mode as compared to an inter coding mode. Similarly, different relation models may be used for different block sizes. Likewise, different relation models may be used for different intra prediction modes.

Additionally or alternatively, process 300 may apply different model parameter generation schemes to different encoding modes. For example, different model parameter generation schemes may be used for an intra coding mode as compared to an inter coding mode. Similarly, different model parameter generation schemes may be used for different block sizes. Likewise, different model parameter generation schemes may be used for different intra prediction modes.

In some examples, model parameters may be adaptively generated from other model parameters in the same layer. In some examples, enhancement layer model parameters may be adaptively generated from base layer model parameters. In some examples, higher layer model parameters may be adaptively generated from lower layers model parameters. In some examples, residual prediction model parameters may be adaptively generated from sample prediction model parameters.

Additionally or alternatively, such a linear relation model or a non-linear relation model may be adaptively applied in response to a block size. Additionally or alternatively, such a linear relation model or a non-linear relation model may be adaptively applied on a block-by-block basis (e.g., as a block of a CU or PU). For example, a picture is coded in the unit of Largest Coding Unit (LCU). A LCU can be a 128×128 block, a 64×64 block, a 32×32 block or a 16×16 block. A LCU can be encoded directly or be divided into 4 Coding Unit (CU) for next level encoding. For a CU in one level, it can be encoded directly or be further divided into next level for encoding. The smallest CU is an 8×8 block. Similarly, at each level a CU whose size is 2N×2N, may be divided into different size of Prediction Units (PU) for prediction. For intra coding, a 2N×2N CU can be encoded in one 2N×2N PU or in four N×N PUs. For inter coding, a 2N×2N CU can be encoded in one 2N×2N PU, or two 2N×N PUs, or two N×2N PUs, or 0.5N×2N PU+1.5N×2N PU, or 1.5N×2N PU+0.5N× 2N PU, or 2N×0.5N PU+2N×1.5N PU, or 2N×1.5N PU+2N×0.5N PU, or four N×N PUs.

In video coding, a Coding Unit (CU) or Prediction Unit (PU) has multiple available coding modes and prediction modes. For example, a CU can be encoded in intra mode or inter mode, and for intra mode, a PU has multiple available prediction mode, e.g., DC prediction, planar prediction, vertical prediction, horizontal prediction and other directional predictions. Process 300 may utilize different coding mode and prediction modes that can have different residual prediction schemes. For example, process 300 may apply linear residual prediction for intra mode and not applying residual prediction for inter mode.

In some examples, the determination of the target prediction residual may include applying model parameters. Fore example, the determination of the target prediction residual may include applying one or more fixed relation model parameters. Additionally or alternatively, the determination of the target prediction residual may include determining one or more relation model parameters. For example, such relation model parameters may be adaptively applied in response to an encoding mode. Additionally or alternatively, such relation model parameters may be adaptively applied in response to a block size. Additionally or alternatively, such a linear relation model or a non-linear relation model may be adaptively applied on a block-by-block basis. In video coding, a Coding Unit (CU) or Prediction Unit (PU) has multiple available coding modes and prediction modes. For example, a CU can be encoded in intra mode or inter mode, and for intra mode, a PU has multiple available prediction mode, e.g., DC prediction, planar prediction, vertical prediction, horizontal prediction and other directional predictions. Process 300 may utilize different coding mode and prediction modes that can have different residual prediction schemes. For example, process 300 may apply fixed parameter linear prediction for intra vertical and horizontal prediction modes, and apply adaptive linear prediction for DC, Planar and other directional prediction modes.

Additionally or alternatively, the determination, via the video coder, of the target prediction residual for the target channel via cross-layer cross-channel prediction may be adaptively applied a block-by-block basis based at least in part on a rate distortion cost. Alternatively, application of residual prediction for a given coding mode or a given prediction mode may be applied mandatorily.

In some examples, the determination, via the video coder, of the target prediction residual for the target channel in the target layer may include selection of the reference layer and reference channel during decoding based at least in part on a flag associated with the target prediction residual block during encoding. In other examples, such a flag may be associated with the entire CU, PU, frame, or the entire prediction residual, instead of being associated with individual blocks. For example, a mechanism to residual prediction may be adaptively applied in response to a coding mode or prediction mode, e.g., on a per-CU or per-PU basis a flag can be used to signal applying residual prediction or not for a particular coding mode or prediction mode. In such an example, application of the flag can be decided based on rate-distortion costs. For example, the optimal model parameters may be adaptively generated on encoder side using reconstructed residuals. In such examples, the information of generation method may be transmitted to the encoder side. For example, model parameters can be generated from reconstructed residuals in a current layer, a lower layer, or a base layer. Similarly, the enhancement layer model parameters may be adaptively generated on encoder side based on input residuals and reconstructed residuals in the same layer, and then may be encoded and transmitted to the decoder. Likewise, the enhancement layer model parameters may be adaptively generated on encoder side based on input residuals in the target layer and reconstructed residuals in a base layer, and then may be encoded and transmitted to the decoder. Further, the higher layer model parameters may be adaptively generated on encoder side based on input residuals in this layer and reconstructed residuals in lower layers, and then may be encoded and transmitted to the decoder.

In other examples, a video decoder may make calculations that parallel those calculations in the video decoder in order to determine how the video decoder would have encoded the video data. In such an example, video decoder may operate without such a flag associated with the target prediction residual block during encoding. For example model parameters may be adaptively generated on the decoder side based on the information of reconstructed residuals in the same layer. In some examples, enhancement layers model parameters may be adaptively generated on the decoder side based on the information of reconstructed residuals in base layer. In some examples, enhancement layers model parameters may be adaptively generated on the decoder side based on the information of reconstructed residuals in base layer and the same enhancement layer. In some examples, higher layer model parameters may be adaptively generated on the decoder side based on the information of reconstructed residuals in lower layers.

More specifically, process 300 (and/or 200) may utilize a cross-layer cross-channel residual prediction model. In such an example, assuming that residuals of channel A are predicted from reconstructed residuals of channel B (not that a similar process can be applied when predicting residuals of channel A from reconstructed residuals of channel B and C, and channel A, B and C may in different layers.), a linear or non-linear model may be applied for the prediction. For instance, for a residual position k, the channel A residual value A(k) may be predicted from reconstructed channel B residual value B'(k) of position k using the following expression:

$$A^P(k)=f(B'(k)) \quad (1)$$

Where $A^P(k)$ may represent the predicted value, $f(\bullet)$ may represent a linear or non-linear function or transform. B'(k) may be in a predefined layer in both encoder and decoder sides. Otherwise, B'(k) may be any of the available layers that depend on the results of optimized calculation, information of B'(k) may be sent to the decoder. In various implementations, the parameters of $f(\bullet)$ may be pre-defined fixed values or be determined using the generated or reconstructed residual values of at least some neighboring pixel positions. In various implementations, the residuals used to generate the parameters of $f(\bullet)$ and the residuals used to predict channel A may be in the same layer or not. Parameters of $f(\bullet)$ may then be obtained, if they are not fixed values, using well techniques such as, for example, linear least squares, non-linear least squares, weighted least squares or other well known optimization methods.

In general, a linear form of $f(\bullet)$ may be expressed as follows:

$$A^P(k)=a*B'(k)+b \quad (2)$$

Where a and b may represent model parameters. The model parameters a and b may be fixed values, or be determined at decoder side, or be determined at encoder side and then be transmitted to decoder side.

In general, a non-linear form of $f(\bullet)$ may be expressed as follows $$A^P(k)=a(k)*B'(k)+b(k) \quad (3)$$

Where a(k) and b(k) may represent non-linear equation parameters. In various implementations, parameters a(k) and b(k) may be determined by the value of B'(k). For example, the range of values of B'(k) may be divided into M smaller subsets S(k) of residuals values. Each subset S(k) may then be assigned different values for a(k) and b(k) to be used in Eq. (3) so that when the value of B'(k) for a particular residuals position lies within a given subset S(k) the corresponding values for a(k) and b(k) are applied to predict the residual value $A^P(k)$ for that position.

Parameters of $f(\bullet)$ in enhancement layer may also be predicted from parameters of $f(\bullet)$ in base layer and/or lower layers. In various implementations, parameters of $f(\bullet)$ may be adaptively generated in the decoder side, or be transmitted to the decoder.

While implementation of example processes 200 and 300, as illustrated in FIGS. 2 and 3, may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 2 and 3 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 2 and 3 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 4:
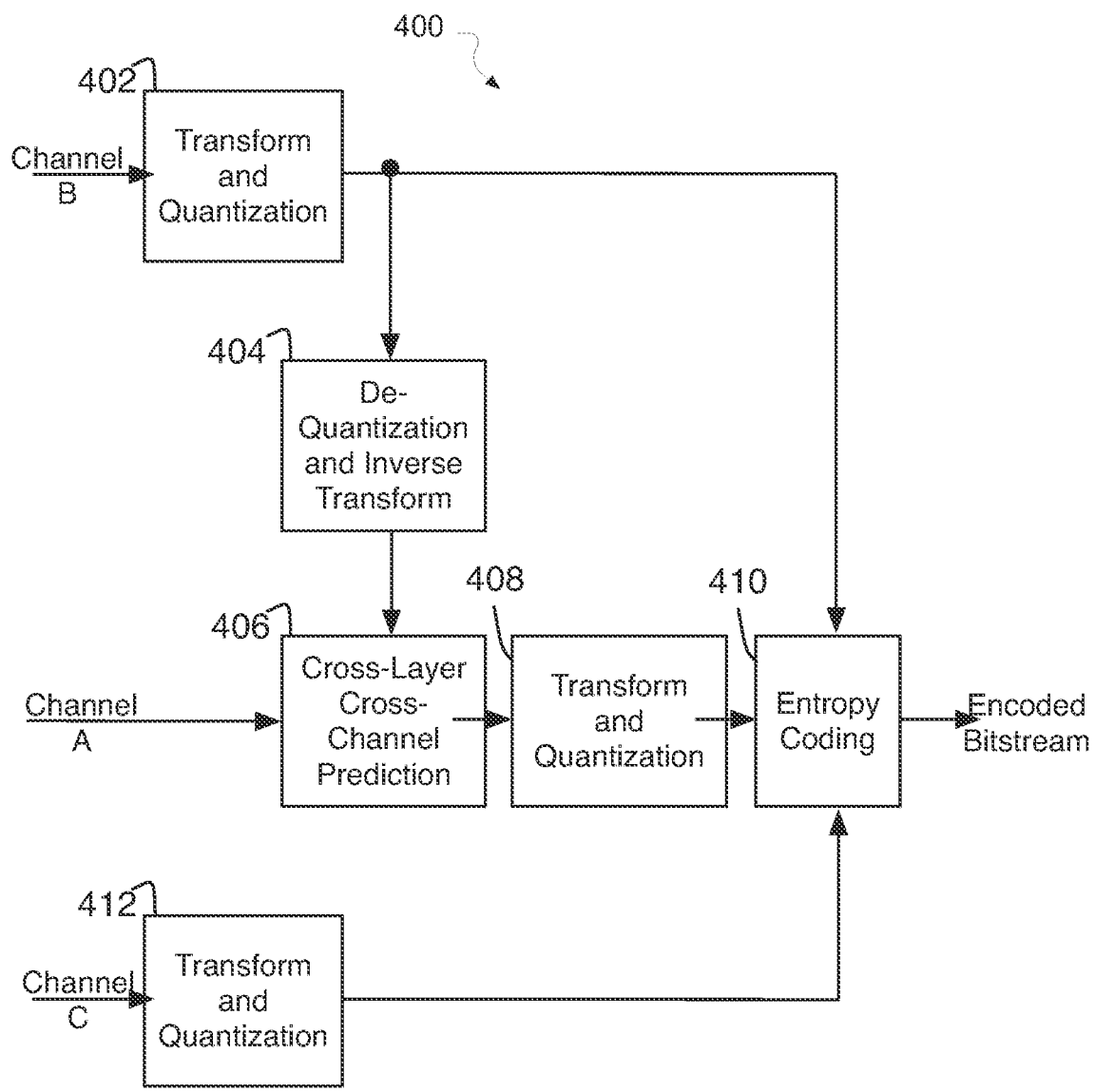
FIG. 4 is an illustrative diagram of example cross-layer cross-channel residual prediction scheme.

FIG. 4 is an illustrative diagram of example cross-layer cross-channel residual prediction scheme in accordance with at least some implementations of the present disclosure. In the illustrated implementation, system 100 of FIG. 1 may implement scheme 400. In scheme 400, the reconstructed predicted residuals of a first channel (B) in a first layer (e.g., a reference layer such as a base layer or lower enhancement layer) are used to predict the residuals of a second channel (A) in a second layer (e.g., a target layer such as a higher enhancement layer) and then the encoded residuals of reference layer channel B and the resulting cross-layer cross-channel predicted residuals of target layer channel A (after being encoded) along with the encoded residuals of a third channel (C) are subjected to entropy encoding.

In various implementations, the channels A, B or C may be located in various layers. For example, when the reference layer associated with channel B is a base layer, the target layer associated with channel A may be an enhancement layer. Likewise, when the reference layer associated with channel B is an enhancement layer, the target layer with channel A may be a higher enhancement layer.

In various implementations, the channels A, B or C may be any one of a luma channel (Y) or chroma channel (U and V), and each of channels A, B or C may be distinct (i.e., different from the other channels). In various implementations, channel A may be a luma channel, and channels B and C may be chroma channels. In other implementations, channel A may be a chroma channel, and one of channels B and C may be a luma channel while the other channel of channels B and C may be the other chroma channel.

Accordingly, target layer channel A may differ from reference layer channel B based on variations in channel type, variation in layer type, or both variation in layer type and variation in channel type.

As depicted in scheme 400, the predicted residuals of reference layer channel B may be transformed and quantized at block 402 and then de-quantized and inverse transformed at block 404 before being provided as the reconstructed residuals of reference layer channel B to a cross-layer cross-channel prediction block 406. At block 206, the reconstructed residuals of reference layer channel B may be used to predict the residuals of target layer channel A. The predicted residuals of target layer channel A may then be transformed and quantized at block 408 before being entropy coded at block 410 along with the transformed and quantized reference layer channel B residuals obtained from block 402, and the transformed and quantized (block 412) predicted residuals of channel C.

In operation, scheme 400 may be utilized to predict residuals of channel A in an enhancement layer from reconstructed residuals of channel B or channel C in a base layer, a lower layer, or the same layer as channel A. If channel B or C is encoded by traditional prediction, the reconstructed residuals of B or C may be traditional prediction residuals (e.g., first-order prediction residuals). Otherwise, the reconstructed residuals of channel B or C may be second-order prediction residuals. In the example illustrated in FIG. 4, the residual of channel A can be predicted from the residual of B or C (e.g., a first-order residual or a second order residual, where the order will depend on the particular coding method used for B and C) directly, and there is no need to convert a second order residual to a first-order residual. In the example illustrated in FIG. 6, which will be discussed in greater detail below, the use of first-order residuals is forced. In such an example, a second-order residual would need to be converted to first-order residual.

As used herein, the term "traditional prediction residual" may refer to a first-order residual. For example, such a first-order residual may represent predicted pixel values being subtracted from original pixel values. Similarly, as used herein, the term "second-order residual" may refer to a construct where a second-order residual of channel A equals a first-order residual of channel A subtracted by a reconstructed first-order residual of channel B (or C), for example.

Figure 5:
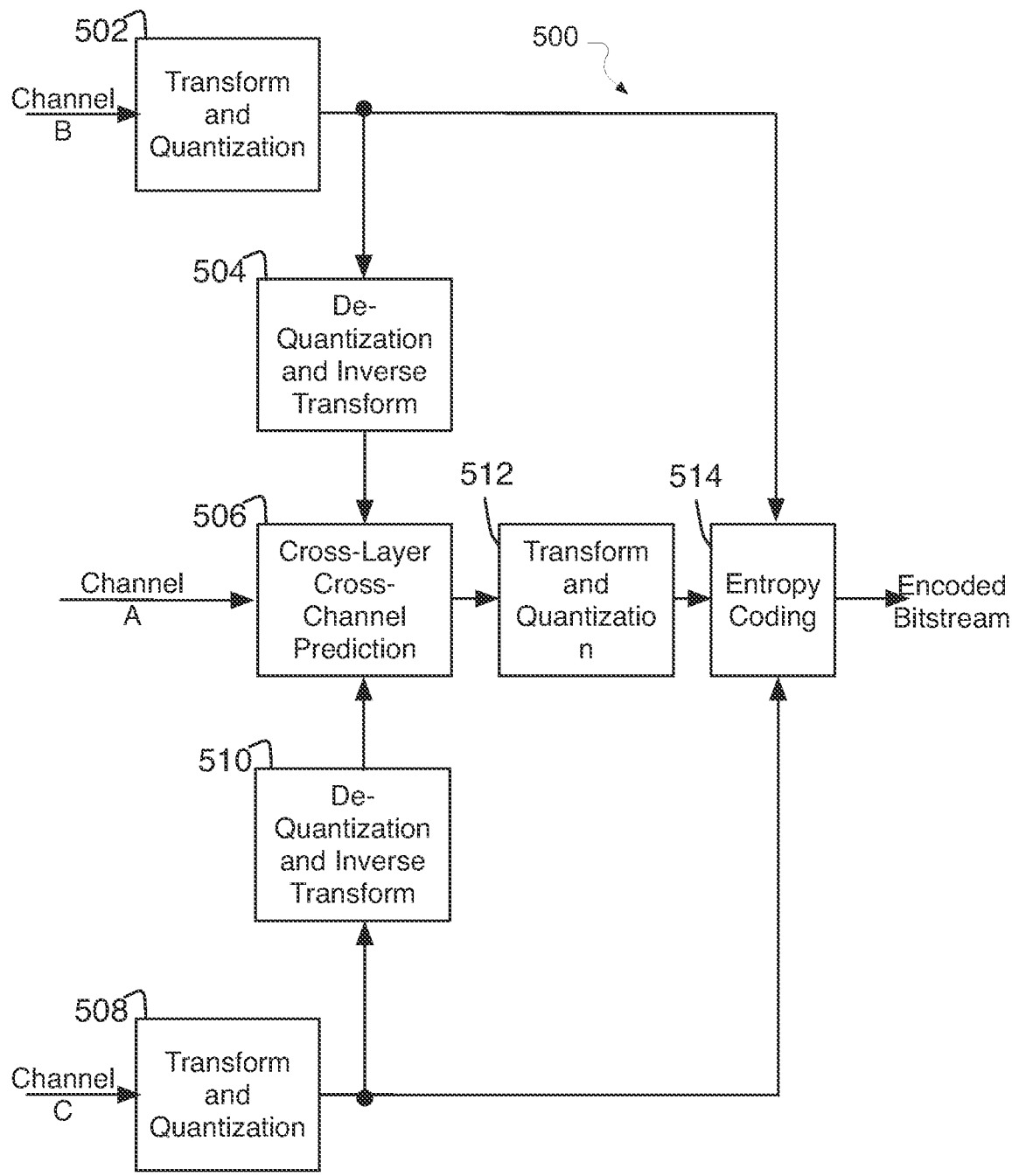
FIG. 5 is an illustrative diagram of a further example cross-layer cross-channel residual prediction scheme.

FIG. 5 is an illustrative diagram of a further example cross-layer cross-channel residual prediction scheme in accordance with at least some implementations of the present disclosure. In the illustrated implementation, system 100 of FIG. 1 may implement scheme 500. In scheme 500, the target prediction residual of channel A may be determined based at least in part on s reference prediction residual of channel B and a further reference prediction residual of channel C.

In scheme 500, the reconstructed predicted residuals of two channels (reference layer channel B and further reference layer channel C) are used to predict the residuals of a third channel (A), and then the encoded residuals of reference layer channel B and further reference layer channel C and the cross-layer cross-channel predicted residuals of target layer channel A (after being encoded) are subjected to entropy encoding.

In various implementations, the channels A, B or C may be located in various layers. For example, when the reference layer associated with channel B is a base layer, the target layer associated with channel A may be an enhancement layer. Likewise, when the reference layer associated with channel B is an enhancement layer, the target layer with channel A may be a higher enhancement layer. Similarly, the further reference layer associated with channel C may be in the same or different layer from the reference layer associated with channel B.

In various implementations, the channels A, B or C may be any one of a luma channel (Y) or chroma channel (U and V), and each of channels A, B or C may be distinct (i.e., different from the other channels). In various implementations, channel A may be a luma channel, and channels B and C may be chroma channels. In other implementations, channel A may be a chroma channel, and one of channels B and C may be a luma channel while the other channel of channels B and C may be the other chroma channel.

Accordingly, target layer channel A may differ from reference layer channel B and differ from further reference layer channel C based on variations in channel type, variation in layer type, or both variation in layer type and variation in channel type.

As depicted in scheme 500, the predicted residuals of reference layer channel B may be transformed and quantized at block 502 and then de-quantized and inverse transformed at block 504 before being provided as reconstructed residuals to a cross-layer cross-channel prediction block 506. Similarly, the predicted residuals of further reference channel C may be transformed and quantized at block 508 and then de-quantized and inverse transformed at block 510 before also being provided as reconstructed residuals to cross-channel prediction block 506. At block 506, the reconstructed residuals of both reference layer channel B and further reference layer channel C may be used to predict the residuals of target layer channel A as described herein. The resulting predicted residuals of target layer channel A may then be transformed and quantized at block 512 before being entropy coded at block 514 along with the encoded residuals of channels B and C.

In operation, scheme 400 may be utilized to predict residuals of channel A in an enhancement layer from reconstructed traditional prediction residuals (e.g., first-order prediction residuals) of channel B or channel C in a base layer, a lower layer, or the same layer as channel A. This reference channel B or C may be encoded by cross-layer cross-channel residual prediction.

Figure 6:
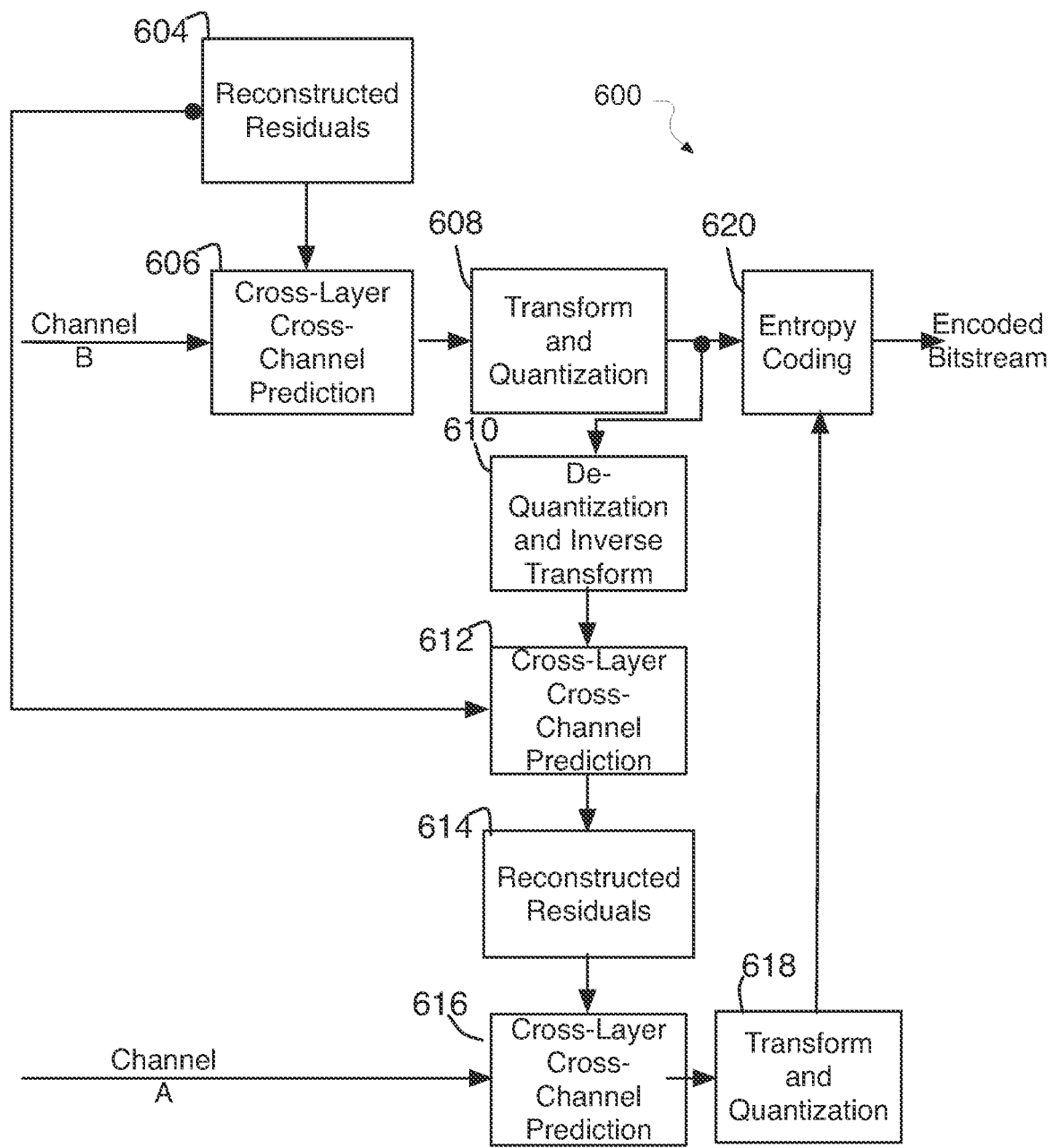
FIG. 6 is an illustrative diagram of a still further example cross-layer cross-channel residual prediction scheme.

FIG. 6 is an illustrative diagram of a still further example cross-layer cross-channel residual prediction scheme in accordance with at least some implementations of the present disclosure. In the illustrated implementation, system 100 of FIG. 1 may implement scheme 600. In scheme 600, the target prediction residual of channel A may be determined based at least in part on a first order residual that had been converted from a second order residual. For example, the video coder may reconstruct a first-order-type reference prediction residual from a second-order-type reference prediction residual of reference layer channel B based at least in part on the reference prediction residual of further reference layer channel C, for example. The determination, via the video coder, of the target prediction residual for the target channel A in the target layer may be based at least in part on the reconstructed first-order-type reference prediction residual.

In scheme 600, reference layer channel B is coded by a residual prediction method. The residual of reference layer channel B is illustrated as a second-order residual. In cases where target layer channel A is to be coded, the first-order residual of reference layer channel B must be obtained first. The reconstructed residuals of block 604 are supplied from further reference channel C or a different channel A (e.g., in a different layer from the target layer channel A in FIG. 6). As depicted in scheme 600, the second-order predicted residuals of channel B may be transformed and quantized at block 608 and then de-quantized and inverse transformed at block 610 before being provided to a first cross-layer cross-channel prediction block 612. The output of de-quantized and inverse transform block 610 is the second-order residual of channel B. The input of block 612 is reconstructed residual of block 604 and the second-order residual of channel B. The output of block 612 is the first-order residual of channel B (illustrated by reconstructed residual block 614). As illustrated, the second-order residual of Channel B needs to have cross-layer cross-channel residual prediction done twice (once at block 606 and once at block 612) because channel B is a second-order residual that needs to be reconstructed into a first-order residual at block 612. At block 616, the reconstructed residuals of channel B are used to predict the residuals of channel A. The resulting cross-layer cross-channel predicted residuals of channel A may then be transformed and quantized at block 618 before the encoded residuals of all three channels are entropy coded at block 620.

In some examples, when the input YUV data are in the format of YUV420 or YUV422, the residuals block size of U and V channels are smaller than that of Y channel. In these cases, if Y channel and U or V channels are in the same spatial resolution layer, down-sampling may be applied on Y channel residuals block if it is used to predict U and/or V channel residuals blocks, or up-sampling may be applied on U and/or V residuals blocks if they are used to predict Y channel residuals block.

Figure 7:
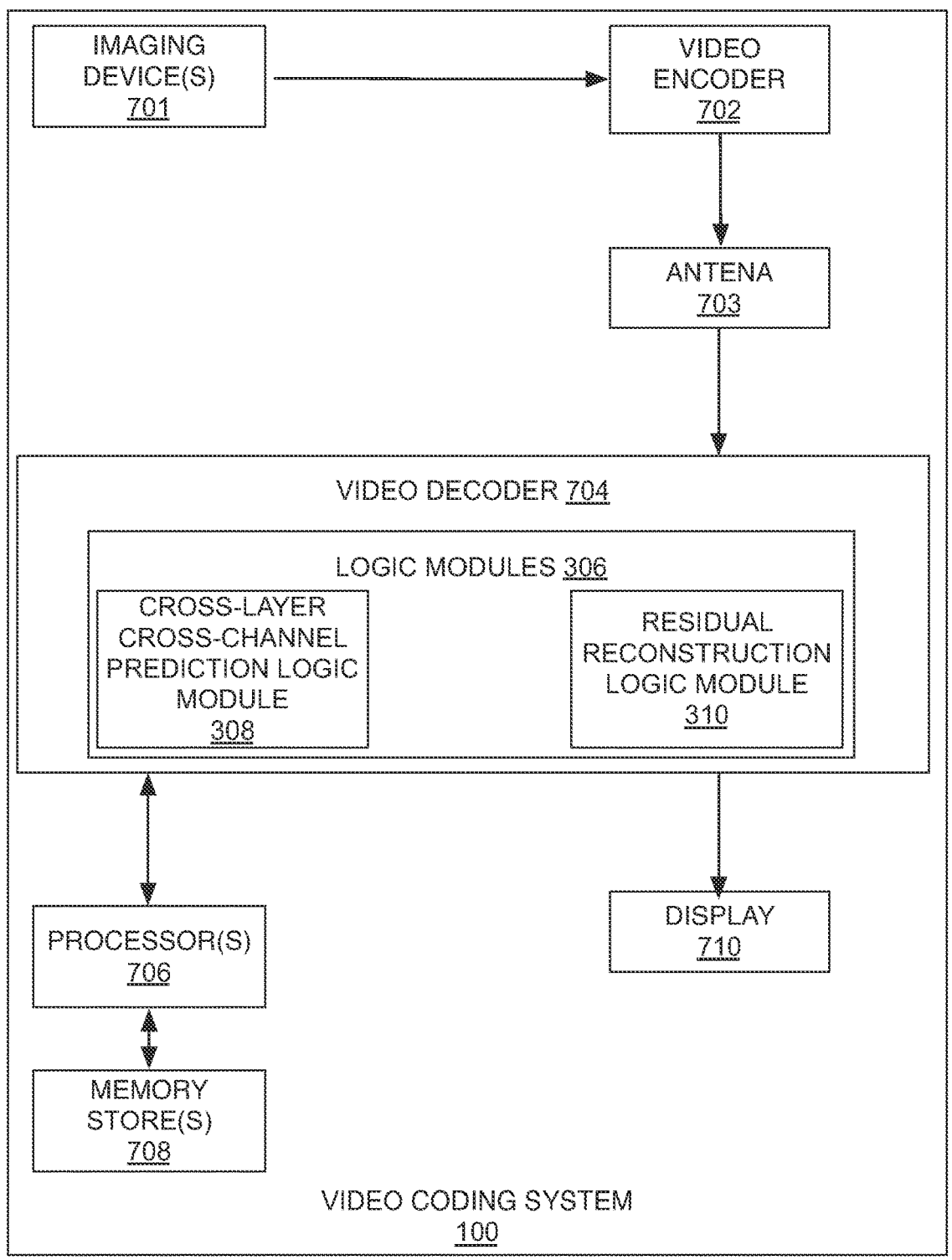
FIG. 7 is an illustrative diagram of an example video coding system.

FIG. 7 is an illustrative diagram of an example video coding system 100, arranged in accordance with at least some implementations of the present disclosure. In the illustrated implementation, video coding system 100 may include imaging device(s) 701, a video encoder 702, an antenna 703, a video decoder 704, one or more processors 706, one or more memory stores 708, a display 710, and/or logic modules 306. Logic modules 306 may include cross-layer cross-channel prediction logic module 308, residual prediction logic module 310, the like, and/or combinations thereof.

As illustrated, antenna 703, video decoder 704, processor 706, memory store 708, and/or display 710 may be capable of communication with one another and/or communication with portions of logic modules 306. Similarly, imaging device(s) 701 and video encoder 702 may be capable of communication with one another and/or communication with portions of logic modules 306. Accordingly, video decoder 704 may include all or portions of logic modules 306, while video encoder 702 may include similar logic modules. Although video coding system 100, as shown in FIG. 7, may include one particular set of blocks or actions associated with particular modules, these blocks or actions may be associated with different modules than the particular module illustrated here.

In some examples, video coding system 100 may include antenna 703, video decoder 704, the like, and/or combinations thereof. Antenna 703 may be configured to receive an encoded bitstream of video data. Video decoder 704 may be communicatively coupled to antenna 703 and may be configured to decode the encoded bitstream. Video decoder 704 may be configured to determine a reference prediction residual for a reference channel in a reference layer of video data, and determine a target prediction residual for a target channel in a target layer based at least in part on the reference prediction residual via cross-layer cross-channel prediction, where the target layer may be a higher layer than the reference layer.

In other examples, video coding system 100 may include display device 710, one or more processors 706, one or more memory stores 708, cross-layer cross-channel prediction logic module 308, residual reconstruction logic module 310, the like, and/or combinations thereof. Display 710 may be configured to present video data. Processors 706 may be communicatively coupled to display 710. Memory stores 708 may be communicatively coupled to the one or more processors 706. Cross-layer cross-channel prediction logic module 308 of video decoder 704 (or video encoder 702 in other examples) may be communicatively coupled to the one or more processors 706 and may be configured to determine a reference prediction residual for a reference channel in a reference layer of video data, and determine a target prediction residual for a target channel in a target layer based at least in part on the reference prediction residual via cross-layer cross-channel prediction. The target layer may be a higher layer than the reference layer, and the target channel may be a different channel than the reference channel. Residual reconstruction logic module 310 of video decoder 704 (or video encoder 702 in other examples) may be communicatively coupled to cross-layer cross-channel prediction logic module 308 and may be configured to reconstruct a target residual based at least in part on the determined target prediction residual.

In various embodiments, cross-layer cross-channel prediction logic module 308 and/or residual reconstruction logic module 310 may be implemented in hardware, while software may implement other logic modules. For example, in some embodiments, cross-layer cross-channel prediction logic module 308 may be implemented by application-specific integrated circuit (ASIC) logic while residual reconstruction logic module 310 may be provided by software instructions executed by logic such as processors 706. However, the present disclosure is not limited in this regard and cross-layer cross-channel prediction logic module 308 and/or residual reconstruction logic module 310 may be implemented by any combination of hardware, firmware and/or software. In addition, memory stores 708 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 708 may be implemented by cache memory.

Figure 8:
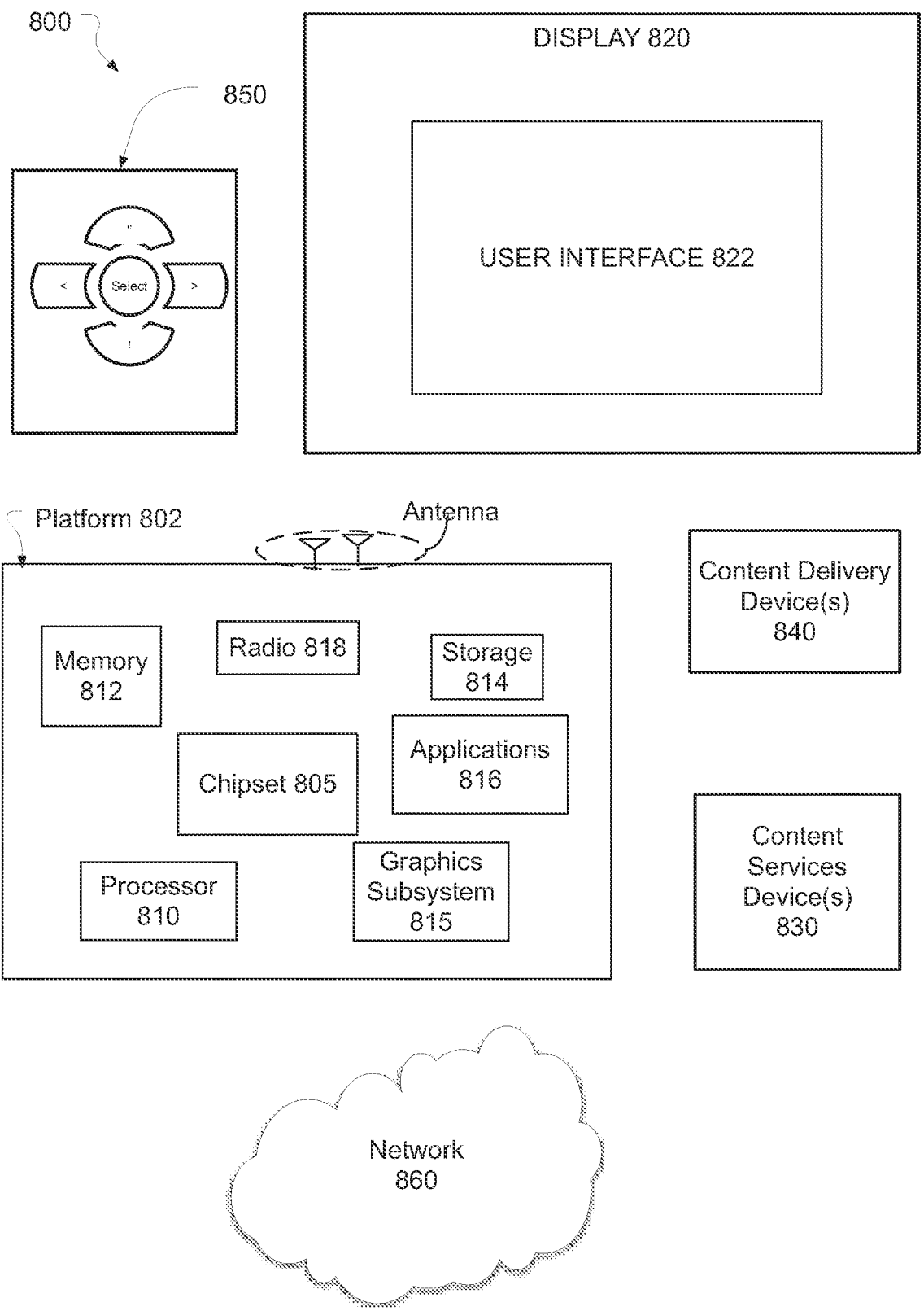
FIG. 8 is an illustrative diagram of an example system.

FIG. 8 illustrates an example system 800 in accordance with the present disclosure. In various implementations, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, Display Port, wireless HDMI, and/or wireless HD compliant techniques. Graphics subsystem 815 may be integrated into processor 810 or chipset 805. In some implementations, graphics subsystem 815 may be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In embodiments, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
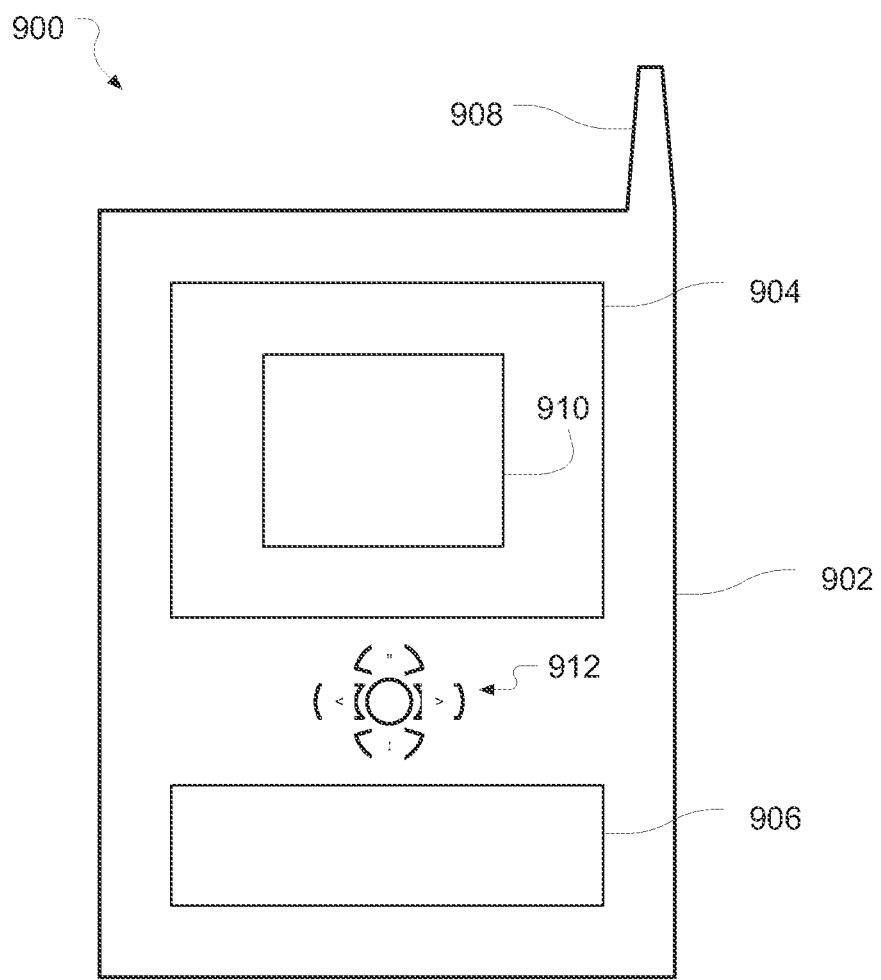
FIG. 9 is an illustrative diagram of an example system, all arranged in accordance with at least some implementations of the present disclosure.

As described above, system 800 may be embodied in varying physical styles or form factors. FIG. 9 illustrates implementations of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing 902, a display 904, an input/output (I/O) device 906, and an antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding may include determining, via a video coder, a reference prediction residual for a reference channel in a reference layer of video data. A determination may be made, via the video coder, of a target prediction residual for a target channel in a target layer based at least in part on the reference prediction residual via cross-layer cross-channel prediction, where the target layer may be a higher layer than the reference layer, and where the target channel may be a different channel than the reference channel.

In another example, a computer-implemented method for video coding may further include determining, via the video coder, a further reference prediction residual for a further reference layer and/or for a further reference channel of the video data. The determination, via the video coder, of the target prediction residual for the target channel in the target layer may be based at least in part on the further reference prediction residual in addition to the reference prediction residual. The target layer may be a higher layer than the further reference layer and/or the target channel may be a different channel than the further reference channel. When the reference layer includes a base layer, the target layer may include an enhancement layer; and when the reference layer includes an enhancement layer, the target layer includes a higher enhancement layer. When the reference channel includes a luma channel, the target channel may include a chroma channel; and when the reference channel includes a chroma channel, the target channel includes one of a luma channel or another chroma channel. The determination of the target prediction residual may include adaptively applying one of a linear relation model or a non-linear relation model in response to an encoding mode and/or in response to a block size on a block-by-block basis. The determination of the target prediction residual may include adaptively applying one of a one or more fixed relation model parameters or adaptively determining one or more relation model parameters in response to an encoding mode and/or in response to a block size on a block-by-block basis. The determination, via the video coder, of the target prediction residual for the target channel via cross-layer cross-channel prediction may be adaptively applied a block-by-block basis based at least in part on a rate distortion cost. The determination, via the video coder, of the target prediction residual for the target channel in the target layer may include selection of the reference layer and reference channel during decoding based at least in part on a flag associated with the target prediction residual block during encoding.

In a further example, a computer-implemented method for video coding may further include determining, via the video coder, a further reference prediction residual for a further reference layer and/or for a further reference channel of the video data. The video coder may reconstruct a first-order-type reference prediction residual from a second-order-type reference prediction residual of the further reference prediction residual based at least in part on the reference prediction residual. The determination, via the video coder, of the target prediction residual for the target channel in the target layer may be based at least in part on the reconstructed first-order-type reference prediction residual of the further reference prediction residual. The target layer may be a higher layer than the further reference layer and/or the target channel may be a different channel than the further reference channel. When the reference layer includes a base layer, the target layer may include an enhancement layer; and when the reference layer includes an enhancement layer, the target layer may include a higher enhancement layer. When the reference channel may include a luma channel, the target channel may include a chroma channel; and when the reference channel may include a chroma channel, the target channel may include one of a luma channel or another chroma channel. The determination of the target prediction residual may include adaptively applying one of a linear relation model or a non-linear relation model in response to an encoding mode and/or in response to a block size on a block-by-block basis. The determination of the target prediction residual may include adaptively applying one of a one or more fixed relation model parameters or adaptively determining one or more relation model parameters in response to an encoding mode and/or in response to a block size on a block-by-block basis. The determination, via the video coder, of the target prediction residual for the target channel via cross-layer cross-channel prediction may be adaptively applied a block-by-block basis based at least in part on a rate distortion cost. The determination, via the video coder, of the target prediction residual for the target channel in the target layer may include selection of the reference layer and reference channel during decoding based at least in part on a flag associated with the target prediction residual block during encoding.

In other examples, a system for video coding on a computer may include a display device, one or more processors, one or more memory stores, a cross-layer cross-channel prediction logic module, a residual reconstruction logic module, the like, and/or combinations thereof. The display device may be configured to present video data. The one or more processors may be communicatively coupled to the display device. The one or more memory stores may be communicatively coupled to the one or more processors. The cross-layer cross-channel prediction logic module of a video coder may be communicatively coupled to the one or more processors and may be configured to determine a reference prediction residual for a reference channel in a reference layer of video data, and determine a target prediction residual for a target channel in a target layer based at least in part on the reference prediction residual via cross-layer cross-channel prediction, where the target layer may be a higher layer than the reference layer, and where the target channel may be a different channel than the reference channel. The residual reconstruction logic module of the video coder may be communicatively coupled to the cross-layer cross-channel prediction logic module and may be configured to reconstruct a target residual based at least in part on the determined target prediction residual.

In another example, the system for video coding on a computer may further include the cross-layer cross-channel prediction logic module being further configured to determine a further reference prediction residual for a further reference layer and/or for a further reference channel of the video data. The determination of the target prediction residual for the target channel in the target layer may be based at least in part on the further reference prediction residual in addition to the reference prediction residual. The target layer may be a higher layer than the further reference layer and/or the target channel may be a different channel than the further reference channel. When the reference layer includes a base layer, the target layer may include an enhancement layer; and when the reference layer includes an enhancement layer, the target layer may include a higher enhancement layer. When the reference channel may include a luma channel, the target channel may include a chroma channel; and when the reference channel may include a chroma channel, the target channel may include one of a luma channel or another chroma channel. The determination of the target prediction residual may include adaptively applying one of a linear relation model or a non-linear relation model in response to an encoding mode and/or in response to a block size on a block-by-block basis. The determination of the target prediction residual may include adaptively applying one of a one or more fixed relation model parameters or adaptively determining one or more relation model parameters in response to an encoding mode and/or in response to a block size on a block-by-block basis. The determination of the target prediction residual for the target channel via cross-layer cross-channel prediction may be adaptively applied a block-by-block basis based at least in part on a rate distortion cost. The determination of the target prediction residual for the target channel in the target layer may include selection of the reference layer and reference channel during decoding based at least in part on a flag associated with the target prediction residual block during encoding.

In a still further example, the system for video coding on a computer may further include the cross-layer cross-channel prediction logic module being further configured to determine a further reference prediction residual for a further reference layer and/or for a further reference channel of the video data. The residual reconstruction logic module may be further configured to reconstruct a first-order-type reference prediction residual from a second-order-type reference prediction residual of the further reference prediction residual based at least in part on the reference prediction residual. The determination of the target prediction residual for the target channel in the target layer may be based at least in part on the reconstructed first-order-type reference prediction residual of the further reference prediction residual. The target layer may be a higher layer than the further reference layer and/or the target channel may be a different channel than the further reference channel. When the reference layer includes a base layer, the target layer may include an enhancement layer; and when the reference layer includes an enhancement layer, the target layer may include a higher enhancement layer. When the reference channel may include a luma channel, the target channel may include a chroma channel; and when the reference channel may include a chroma channel, the target channel may include one of a luma channel or another chroma channel. The determination of the target prediction residual may include adaptively applying one of a linear relation model or a non-linear relation model in response to an encoding mode and/or in response to a block size on a block-by-block basis. The determination of the target prediction residual may include adaptively applying one of a one or more fixed relation model parameters or adaptively determining one or more relation model parameters in response to an encoding mode and/or in response to a block size on a block-by-block basis. The determination of the target prediction residual for the target channel via cross-layer cross-channel prediction may be adaptively applied a block-by-block basis based at least in part on a rate distortion cost. The determination of the target prediction residual for the target channel in the target layer may include selection of the reference layer and reference channel during decoding based at least in part on a flag associated with the target prediction residual block during encoding.

In still other examples, a system may include an antenna, a video decoder, the like, and/or combinations thereof. The antenna may be configured to receive an encoded bitstream of video data. The video decoder may be communicatively coupled to the antenna and may be configured to decode the encoded bitstream. The video decoder may be configured to determine a reference prediction residual for a reference channel in a reference layer of video data, and determine a target prediction residual for a target channel in a target layer based at least in part on the reference prediction residual via cross-layer cross-channel prediction, where the target layer may be a higher layer than the reference layer.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:
    determining, via a video coder, a reference prediction residual by residual prediction for a reference color channel in a reference layer of video data; and
    determining, via the video coder, a target prediction residual for a target color channel in a target layer based at least in part on the reference prediction residual via cross-layer cross-color-channel residual prediction, wherein the target layer is a higher layer than the reference layer, and wherein the target color channel is only a different color channel than the reference color channel so that the target color channel of type A from an ABC color scheme is associated with the reference color channels of type B and/or type C but not type A from the ABC color scheme.

2. The method of claim 1, wherein when the reference layer comprises a base layer, the target layer comprises an enhancement layer; and wherein when the reference layer comprises an enhancement layer, the target layer comprises a higher enhancement layer.

3. The method of claim 1, wherein when the reference color channel comprises a luma color channel, the target color channel comprises a chroma color channel; and wherein when the reference channel comprises a chroma color channel, the target color channel comprises one of a luma color channel or another chroma color channel.

4. The method of claim 1, further comprising:
determining, via the video coder, a further reference prediction residual for a further reference layer and/or for a further reference color channel of the video data.

5. The method of claim 1, further comprising:
determining, via the video coder, a further reference prediction residual for a further reference layer and/or for a further reference color channel of the video data,
wherein the determination, via the video coder, of the target prediction residual for the target color channel in the target layer is based at least in part on the further reference prediction residual in addition to the reference prediction residual, and
wherein the target layer is a higher layer than the further reference layer and/or the target color channel is a different color channel than the further reference color channel.

6. The method of claim 1, further comprising:
reconstructing, via the video coder, a first-order-type reference prediction residual from a second-order-type reference prediction residual, and
wherein the determination, via the video coder, of the target prediction residual for the target color channel in the target layer is based at least in part on the reconstructed first-order-type reference prediction residual.

7. The method of claim 1, further comprising:
determining, via the video coder, a further reference prediction residual for a further reference layer and/or for a further reference color channel of the video data; and
reconstructing, via the video coder, a first-order-type reference prediction residual from a second-order-type reference prediction residual of the further reference prediction residual based at least in part on the reference prediction residual,
wherein the determination, via the video coder, of the target prediction residual for the target color channel in the target layer is based at least in part on the reconstructed first-order-type reference prediction residual of the further reference prediction residual, and
wherein the target layer is a higher layer than the further reference layer and/or the target color channel is a different color channel than the further reference color channel.

8. The method of claim 1, wherein the determination, via the video coder, of the target prediction residual for the target color channel in the target layer comprises selection of the reference layer and reference color channel during decoding based at least in part on a flag associated with the target prediction residual during encoding.

9. The method of claim 1, wherein determining the target prediction residual comprises applying one of a linear relation model or a non-linear relation model.

10. The method of claim 1, wherein determining the target prediction residual comprises adaptively applying one of a linear relation model or a non-linear relation model in response to an encoding mode and/or in response to a block size on a block-by-block basis.

11. The method of claim 1, wherein determining the target prediction residual comprises applying one of a linear relation model or a non-linear relation model, wherein determining the target prediction residual comprises adaptively applying one of a one or more fixed relation model parameters or adaptively determining one or more relation model parameters in response to an encoding mode and/or in response to a block size on a block-by-block basis.

12. The method of claim 1, wherein determining the target prediction residual comprises adaptively applying one of a linear relation model or a non-linear relation model in response to an encoding mode and/or in response to a block size on a block-by-block basis, wherein determining the target prediction residual comprises adaptively applying one of a one or more fixed relation model parameters or adaptively determining one or more relation model parameters in response to an encoding mode and/or in response to a block size on a block-by-block basis.

13. The method of claim 1, wherein the determination, via the video coder, of the target prediction residual for the target color channel via cross-layer cross-color-channel residual prediction is adaptively applied a block-by-block basis based at least in part on a rate distortion cost.

14. The method of claim 1, further comprising:
determining, via the video coder, a further reference prediction residual for a further reference layer and/or for a further reference color channel of the video data,
wherein the determination, via the video coder, of the target prediction residual for the target color channel in the target layer is based at least in part on the further reference prediction residual in addition to the reference prediction residual,
wherein the target layer is a higher layer than the further reference layer and/or the target color channel is a different color channel than the further reference color channel,
wherein when the reference layer comprises a base layer, the target layer comprises an enhancement layer; and wherein when the reference layer comprises an enhancement layer, the target layer comprises a higher enhancement layer,
wherein when the reference color channel comprises a luma color channel, the target color channel comprises a chroma color channel; and wherein when the reference color channel comprises a chroma color channel, the target color channel comprises one of a luma color channel or another chroma color channel,
wherein determining the target prediction residual comprises adaptively applying one of a linear relation model or a non-linear relation model in response to an encoding mode and/or in response to a block size on a block-by-block basis,
wherein determining the target prediction residual comprises adaptively applying one of a one or more fixed relation model parameters or adaptively determining one or more relation model parameters in response to an encoding mode and/or in response to a block size on a block-by-block basis, wherein the determination, via the video coder, of the target prediction residual for the target color channel via cross-layer cross-color-channel residual prediction is adaptively applied a block-by-block basis based at least in part on a rate distortion cost, and wherein the determination, via the video coder, of the target prediction residual for the target color channel in the target layer comprises selection of the reference layer and reference color channel during decoding based at least in part on a flag associated with the target prediction residual block during encoding.

15. The method of claim 1, further comprising:

determining, via the video coder, a further reference prediction residual for a further reference layer and/or for a further reference color channel of the video data; and reconstructing, via the video coder, a first-order-type reference prediction residual from a second-order-type reference prediction residual of the further reference prediction residual based at least in part on the reference prediction residual, and wherein the determination, via the video coder, of the target prediction residual for the target color channel in the target layer is based at least in part on the reconstructed first-order-type reference prediction residual of the further reference prediction residual, wherein the target layer is a higher layer than the further reference layer and/or the target color channel is a different color channel than the further reference color channel, wherein when the reference layer comprises a base layer, the target layer comprises an enhancement layer; and wherein when the reference layer comprises an enhancement layer, the target layer comprises a higher enhancement layer, wherein when the reference color channel comprises a luma color channel, the target color channel comprises a chroma color channel; and wherein when the reference color channel comprises a chroma color channel, the target color channel comprises one of a luma color channel or another chroma color channel, wherein determining the target prediction residual comprises adaptively applying one of a linear relation model or a non-linear relation model in response to an encoding mode and/or in response to a block size on a block-by-block basis, wherein determining the target prediction residual comprises adaptively applying one of a one or more fixed relation model parameters or adaptively determining one or more relation model parameters in response to an encoding mode and/or in response to a block size on a block-by-block basis, wherein the determination, via the video coder, of the target prediction residual for the target color channel via cross-layer cross-color-channel residual prediction is adaptively applied a block-by-block basis based at least in part on a rate distortion cost, and wherein the determination, via the video coder, of the target prediction residual for the target color channel in the target layer comprises selection of the reference layer and reference color channel during decoding based at least in part on a flag associated with the target prediction residual block during encoding.

16. A system for video coding on a computer, comprising:

a display device configured to present video data;

one or more processors communicatively coupled to the display device;

one or more memory stores communicatively coupled to the one or more processors;

a cross-layer cross-color-channel residual prediction logic module of a video coder communicatively coupled to the one or more processors and configured to:

determine a reference prediction residual by residual prediction for a reference color channel in a reference layer of video data, and determine a target prediction residual for a target color channel in a target layer based at least in part on the reference prediction residual via cross-layer cross-color-channel residual prediction, wherein the target layer is a higher layer than the reference layer, and wherein the target color channel is only a different color channel than the reference color channel so that the target color channel of type A from an ABC color scheme is associated with the reference color channels of type B and/or type C but not type A from the ABC color scheme; and a residual reconstruction logic module of the video coder communicatively coupled to the cross-layer cross-color-channel residual prediction logic module and configured to reconstruct a target residual based at least in part on the determined target prediction residual.

17. The system of claim 16, wherein when the reference layer comprises a base layer, the target layer comprises an enhancement layer; and wherein when the reference layer comprises an enhancement layer, the target layer comprises a higher enhancement layer.

18. The system of claim 16, wherein when the reference color channel comprises a luma color channel, the target color channel comprises a chroma color channel; and wherein when the reference color channel comprises a chroma color channel, the target color channel comprises one of a luma color channel or another chroma color channel.

19. The system of claim 16, wherein the cross-layer cross-color-channel residual prediction logic module is further configured to determine a further reference prediction residual for a further reference layer and/or for a further reference color channel of the video data, wherein the determination of the target prediction residual for the target color channel in the target layer is based at least in part on the further reference prediction residual in addition to the reference prediction residual, and wherein the target layer is a higher layer than the further reference layer and/or the target color channel is a different color channel than the further reference color channel.

20. The system of claim 16, further comprising:

wherein the cross-layer cross-color-channel residual prediction logic module is further configured to determine a further reference prediction residual for a further reference layer and/or for a further reference color channel of the video data; and wherein the residual reconstruction logic module is further configured to reconstruct a first-order-type reference prediction residual from a second-order-type reference prediction residual of the further reference prediction residual based at least in part on the reference prediction residual, wherein the determination of the target prediction residual for the target color channel in the target layer is based at least in part on the reconstructed first-order-type reference prediction residual of the further reference prediction residual, and wherein the target layer is a higher layer than the further reference layer and/or the target color channel is a different color channel than the further reference color channel.

21. The system of claim 16, further comprising:

wherein the cross-layer cross-color-channel residual prediction logic module is further configured to determine a further reference prediction residual for a further reference layer and/or for a further reference color channel of the video data, wherein the determination of the target prediction residual for the target color channel in the target layer is based at least in part on the further reference prediction residual in addition to the reference prediction residual, wherein the target layer is a higher layer than the further reference layer and/or the target color channel is a different color channel than the further reference color channel, wherein when the reference layer comprises a base layer, the target layer comprises an enhancement layer; and wherein when the reference layer comprises an enhancement layer, the target layer comprises a higher enhancement layer, wherein when the reference color channel comprises a luma color channel, the target color channel comprises a chroma color channel; and wherein when the reference color channel comprises a chroma color channel, the target color channel comprises one of a luma color channel or another chroma color channel, wherein determining the target prediction residual comprises adaptively applying one of a linear relation model or a non-linear relation model in response to an encoding mode and/or in response to a block size on a block-by-block basis, wherein determining the target prediction residual comprises adaptively applying one of a one or more fixed relation model parameters or adaptively determining one or more relation model parameters in response to an encoding mode and/or in response to a block size on a block-by-block basis, wherein the determination of the target prediction residual for the target color channel via cross-layer cross-color-channel residual prediction is adaptively applied a block-by-block basis based at least in part on a rate distortion cost, and wherein the determination of the target prediction residual for the target color channel in the target layer comprises selection of the reference layer and reference color channel during decoding based at least in part on a flag associated with the target prediction residual block during encoding.

22. The system of claim 16, further comprising:

wherein the cross-layer cross-color-channel residual prediction logic module is further configured to determine a further reference prediction residual for a further reference layer and/or for a further reference color channel of the video data; and wherein the residual reconstruction logic module is further configured to reconstruct a first-order-type reference prediction residual from a second-order-type reference prediction residual of the further reference prediction residual based at least in part on the reference prediction residual, and wherein the determination of the target prediction residual for the target color channel in the target layer is based at least in part on the reconstructed first-order-type reference prediction residual of the further reference prediction residual, wherein the target layer is a higher layer than the further reference layer and/or the target color channel is a different color channel than the further reference color channel, wherein when the reference layer comprises a base layer, the target layer comprises an enhancement layer; and wherein when the reference layer comprises an enhancement layer, the target layer comprises a higher enhancement layer, wherein when the reference color channel comprises a luma color channel, the target color channel comprises a chroma color channel; and wherein when the reference color channel comprises a chroma color channel, the target color channel comprises one of a luma color channel or another chroma color channel, wherein determining the target prediction residual comprises adaptively applying one of a linear relation model or a non-linear relation model in response to an encoding mode and/or in response to a block size on a block-by-block basis, wherein determining the target prediction residual comprises adaptively applying one of a one or more fixed relation model parameters or adaptively determining one or more relation model parameters in response to an encoding mode and/or in response to a block size on a block-by-block basis, wherein the determination of the target prediction residual for the target color channel via cross-layer cross-color-channel residual prediction is adaptively applied a block-by-block basis based at least in part on a rate distortion cost, and wherein the determination of the target prediction residual for the target color channel in the target layer comprises selection of the reference layer and reference color channel during decoding based at least in part on a flag associated with the target prediction residual block during encoding.

23. A system comprising:

an antenna configured to receive an encoded bitstream of video data; and a video decoder communicatively coupled to the antenna and configured to decode the encoded bitstream, wherein the video decoder is configured to:

determine a reference prediction residual by residual prediction for a reference color channel in a reference layer of video data, and determine a target prediction residual for a target color channel in a target layer based at least in part on the reference prediction residual via cross-layer cross-color-channel residual prediction, wherein the target layer is a higher layer than the reference layer, and wherein the target color channel is only a different color channel than the reference color channel so that the target color channel of type A from an ABC color scheme is associated with the reference color channels of type B and/or type C but not type A from the ABC color scheme.

24. The system of claim 23, wherein the video decoder is further configured to:

determine a further reference prediction residual for a further reference layer and/or for a further reference color channel of the video data, wherein the determination of the target prediction residual for the target color channel in the target layer is based at least in part on the further reference prediction residual in addition to the reference prediction residual, wherein the target layer is a higher layer than the further reference layer and/or the target color channel is a different color channel than the further reference color channel, wherein when the reference layer comprises a base layer, the target layer comprises an enhancement layer; and wherein when the reference layer comprises an enhancement layer, the target layer comprises a higher enhancement layer, wherein when the reference color channel comprises a luma color channel, the target color channel comprises a chroma color channel; and wherein when the reference color channel comprises a chroma color channel, the target color channel comprises one of a luma color channel or another chroma color channel, wherein determining the target prediction residual comprises adaptively applying one of a linear relation model or a non-linear relation model in response to an encoding mode and/or in response to a block size on a block-by-block basis, wherein determining the target prediction residual comprises adaptively applying one of a one or more fixed relation model parameters or adaptively determining one or more relation model parameters in response to an encoding mode and/or in response to a block size on a block-by-block basis, wherein the determination of the target prediction residual for the target color channel via cross-layer cross-color-channel residual prediction is adaptively applied a block-by-block basis based at least in part on a rate distortion cost, and wherein the determination of the target prediction residual for the target color channel in the target layer comprises selection of the reference layer and reference color channel during decoding based at least in part on a flag associated with the target prediction residual block during encoding.

25. The system of claim 23, wherein the video decoder is configured to:

determine a further reference prediction residual for a further reference layer and/or for a further reference color channel of the video data; and reconstruct a first-order-type reference prediction residual from a second-order-type reference prediction residual of the further reference prediction residual based at least in part on the reference prediction residual, and wherein the determination of the target prediction residual for the target color channel in the target layer is based at least in part on the reconstructed first-order-type reference prediction residual of the further reference prediction residual, wherein the target layer is a higher layer than the further reference layer and/or the target color channel is a different color channel than the further reference color channel, wherein when the reference layer comprises a base layer, the target layer comprises an enhancement layer; and wherein when the reference layer comprises an enhancement layer, the target layer comprises a higher enhancement layer, wherein when the reference color channel comprises a luma color channel, the target color channel comprises a chroma color channel; and wherein when the reference color channel comprises a chroma color channel, the target color channel comprises one of a luma color channel or another chroma color channel, wherein determining the target prediction residual comprises adaptively applying one of a linear relation model or a non-linear relation model in response to an encoding mode and/or in response to a block size on a block-by-block basis, wherein determining the target prediction residual comprises adaptively applying one of a one or more fixed relation model parameters or adaptively determining one or more relation model parameters in response to an encoding mode and/or in response to a block size on a block-by-block basis, wherein the determination of the target prediction residual for the target color channel via cross-layer cross-color-channel residual prediction is adaptively applied a block-by-block basis based at least in part on a rate distortion cost, and wherein the determination of the target prediction residual for the target color channel in the target layer comprises selection of the reference layer and reference color channel during decoding based at least in part on a flag associated with the target prediction residual block during encoding.

* * * * *